(12) United States Patent
Park et al.

(10) Patent No.: US 7,348,072 B2
(45) Date of Patent: Mar. 25, 2008

(54) LIGHT-EMITTING POLYMER AND ORGANOELECTROLUMINESCENT DISPLAY USING THE SAME

(75) Inventors: Sang-Hoon Park, Seongnam-si (KR); Soo-Hyoung Lee, Suwon-si (KR); Sang-Yeol Kim, Seoul (KR); Jhun-Mo Son, Yongin-si (KR); Dong-Yu Kim, Gwangju-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 525 days.

(21) Appl. No.: 10/995,299

(22) Filed: Nov. 24, 2004

(65) Prior Publication Data

US 2005/0123802 A1   Jun. 9, 2005

(30) Foreign Application Priority Data

Dec. 9, 2003   (KR) .................... 10-2003-0089077

(51) Int. Cl.
*H01L 51/54* (2006.01)
*C09K 11/06* (2006.01)
*C08G 59/00* (2006.01)

(52) U.S. Cl. .................. 428/690; 428/917; 257/40; 257/E51.027; 257/E51.032; 257/E51.036; 257/E51.046; 313/504; 313/506; 528/8; 528/10; 528/394; 528/397; 528/403; 528/423

(58) Field of Classification Search .................... None
See application file for complete search history.

(56) References Cited

U.S. PATENT DOCUMENTS

| | | | |
|---|---|---|---|
| 5,621,131 A | | 4/1997 | Kreuder et al. |
| 5,763,636 A | | 6/1998 | Kreuder et al. |
| 5,859,211 A | * | 1/1999 | Kreuder et al. ............. 528/403 |
| 6,169,163 B1 | | 1/2001 | Woo et al. |
| 2005/0038223 A1 | * | 2/2005 | Becker et al. ................ 528/86 |

FOREIGN PATENT DOCUMENTS

| | | |
|---|---|---|
| JP | 2002-326965 | 11/2002 |

* cited by examiner

*Primary Examiner*—Dawn Garrett
*Assistant Examiner*—Brett A Crouse
(74) *Attorney, Agent, or Firm*—Robert E. Bushnell, Esq.

(57) ABSTRACT

A spirofluorene-type of a blue light-emitting polymer including an indenofluorene repeating unit having a spiroanthracene structure, and an organic electroluminescent display using the polymer. The brightness and efficiency property of the organic electroluminescent display are improved.

20 Claims, 6 Drawing Sheets

LIGHT-EMITTING POLYMER AND ORGANOELECTROLUMINESCENT DISPLAY USING THE SAME

CLAIM OF PRIORITY

This application claims the priority of Korean Patent Application No. 2003-89077, filed on Dec. 9, 2003, in the Korean Intellectual Property Office, the disclosure of which is incorporated herein in its entirety by reference.

BACKGROUND OF THE INVENTION

1. Field of the Invention

The present invention relates to a light-emitting polymer and an organic electroluminescent display using the same, and more particularly, to a blue light-emitting polymer and an organic electroluminescent display of which brightness and efficiency property are improved using the polymer.

2. Description of the Related Art

An organic electroluminescent display is largely classified according to an organic film-forming material and a manufacturing process into a display using a small molecule and a display using a polymer material. When preparing the display using a small molecule, a thin film is formed through vacuum deposition. Accordingly, a light emitting material can be highly purified, and a color pixel can be easily embodied. However, improving quantum efficiency, preventing a thin film from crystallizing, and improving color purity are still to be solved.

Research concerning the electroluminescent display using a polymer material is actively being conducted since it was reported that poly(1,4-phenylenevinylene) (PPV), a π-conjugated polymer, emits light when a current is applied to it. The π-conjugated polymer has a chemical structure in which a single bond (or a σ bond) and a double bond (or a π bond) are present alternately, and π it electron is delocalized and can be moved freely following bond chains. Due to such semiconductor-like property, the π-conjugated polymer that emits the whole range of visible light corresponding to the highest occupied molecular orbital—the unoccupied molecular orbital (HOMO-UMO) band-gap when using it in a light-emitting layer of an electroluminescent display can be easily obtained by designing molecules. The π-conjugated polymer can form simply a thin film by spin-coating or a printing method, and thus a display preparation process using polymer material is simple and economical. The π-conjugated polymer also has high glass transition temperature, and thus, it can provide a thin film having superior mechanical property.

However, the organic electroluminescent display using a polymer material has problems such as low color purity, high driving voltage, low efficiency, etc., and thus research to solve such problems is in progress. For example, a poly(9,9-alkylfluorene) (PAF) or a fluorine-containing copolymer (see U.S. Pat. No. 6,169,163 entitled Fluorene-containing Polymers and Compounds Useful in the Preparation thereof to Woo, et al., and issued on Jan. 2, 2001.) exhibits high light-emitting efficiency and high efficiency in color images through copolymerization, but the lifetime of the material itself is short due to photooxidation and a defect within the backbone of the polymer. Thus, the short lifetime of a light-emitting polymer, particularly the blue light-emitting polymer, has hindered the development of the organic electroluminescent display.

Research results that a spirofluorene compound can be used as a blue light-emitting polymer are reported in U.S. Pat. No. 5,621,131 entitled Conjugated Polymers having Spiro Centers and their Use as Electroluminescence Materials to Kreudo, et al. and issued on Apr. 15, 1997 and U.S. Pat. No. 5,763,636 entitled Polymers containing Spiro Atoms and Methods of Using the Same as Electroluminescence Materials to Kreudo, et al. and issued on Jun. 9, 1998, and Japanese Patent Publication No. 2002/326965 entitled Spirofluorene Compound, Method for Producing the Same, Intermediate for Synthesizing the Same, and Organic Electroluminescent Element Using the Spirofluorene Compound to Tetsuaki, et al. and published on Nov. 15, 2002.

SUMMARY OF THE INVENTION

It is therefore an object of the present invention to provide an improved light-emitting polymer.

It is another object of the present invention to provide an improved organic electroluminescent display.

It is further an object of the present invention to provide a light-emitting polymer that has superior charge mobility and light-emitting property and is stable thermally or chemically.

It is still an object of the present invention to provide an organic electroluminescent display of which efficiency and brightness characteristic is improved using the polymer.

In order to achieve above and other objects and according to an aspect of the present invention, there is provided a light-emitting polymer represented by the formula I:

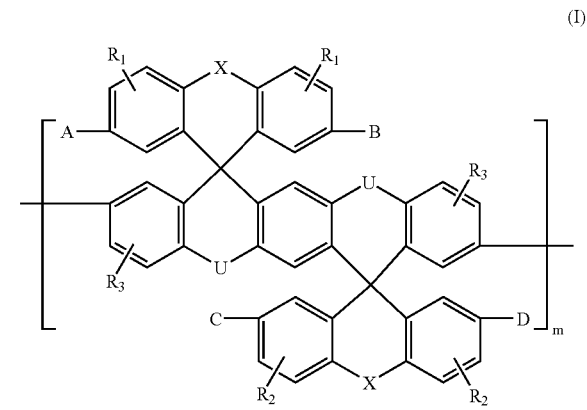

(I)

In the formula I, X and U are independently selected from the group consisting of a single bond, —O—, —S—, —CO—, —Si(R')(R")—, —N(R')—, —C(R')(R")—, and at least one of X and U is not a single bond;

A, B, C and D are independently selected from the group consisting of a hydrogen atom, a substituted or unsubstituted C1-C30 alkylene group, a substituted or unsubstituted C2-C30 alkenylene group, a substituted or unsubstituted C3-C20 cyclic alkylene group, a substituted or unsubstituted C6-C30 arylene group, and a substituted or unsubstituted C2-C30 heteroarylene group;

$R_1$, $R_2$ and $R_3$ are independently selected from the group consisting of a hydrogen atom, a substituted or unsubstituted C1-C30 alkyl group, a substituted or unsubstituted C1-C30 alkoxy group, a substituted or unsubstituted C3-C20 cyclic alkyl group, a substituted or unsubstituted C6-C30 aryl group, a substituted or unsubstituted C6-C30 arylalkyl group, a substituted or unsubstituted C2-C30 heteroaryl group, a hydroxy group, a cyano group and —N(R')(R") in which R' and R" are independently selected from the group consisting of a hydrogen atom, a substituted or unsubstituted C1-C30 alkyl group, a substituted or unsubstituted C6-C30 aryl group, a substituted or unsubstituted C2-C30 heteroaryl group, and a substituted or unsubstituted C3-C20 cyclic alkyl group; and m is a degree of polymerization and is a real number from 5 to 1,000.

According to another aspect of the present invention, there is provided an organic electroluminescent display comprising an organic film between a pair of electrodes, wherein the organic film comprises the above-described light-emitting polymer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
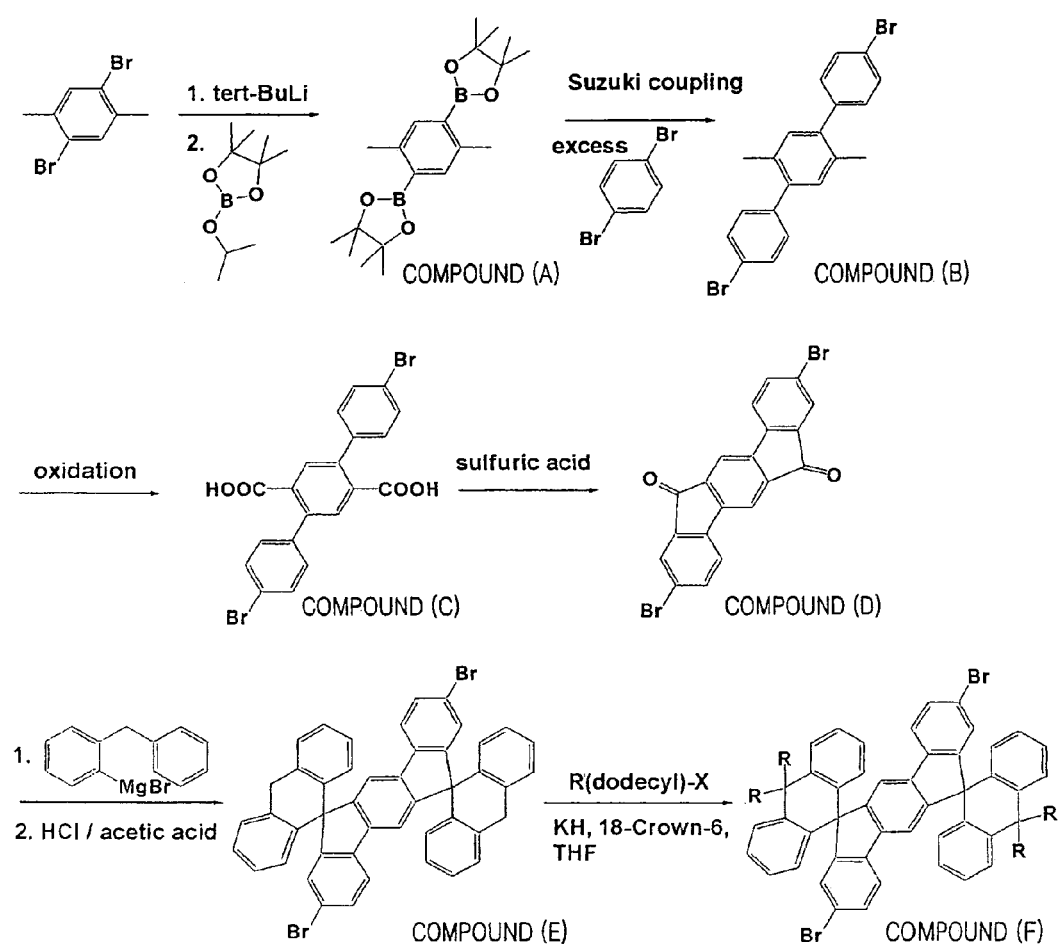
FIG. 1 is a schematic diagram illustrating the synthesis scheme of a compound prepared according to the preparation example 1 by using an indenofluorene repeating unit having spiroanthracene structure.

The present invention provides a light-emitting polymer represented by the formula I:

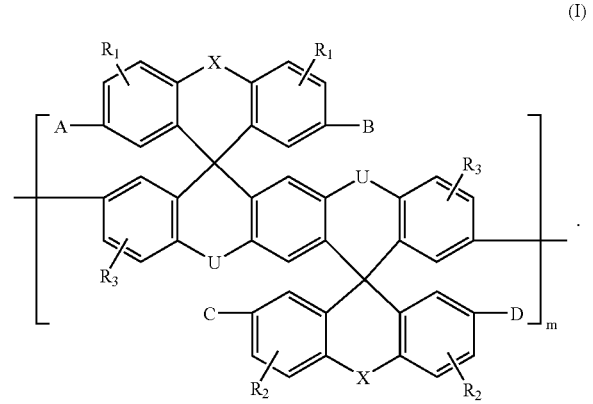

(I)

In the formula I, X and U each represent a single bond, —O—, —S—, —CO—, —Si(R')(R")—, —N(R')—, or —C(R')(R")—, and at least one of X and U is not a single bond;

A, B, C and D are each a hydrogen atom, a substituted or unsubstituted C1-C30 alkylene group, a substituted or unsubstituted C2-C30 alkenylene group, a substituted or unsubstituted C3-C20 cyclic alkylene group, a substituted or unsubstituted C6-C30 arylene group, or a substituted or unsubstituted C2-C30 heteroarylene group;

$R_1$, $R_2$ and $R_3$ are each a mono-substituted or a multi-substituted functional group, and may be a hydrogen atom, a substituted or unsubstituted C1-C30 alkyl group, a substituted or unsubstituted C1-C30 alkoxy group, a substituted or unsubstituted C3-C20 cyclic alkyl group, a substituted or unsubstituted C6-C30 aryl group, a substituted or unsubstituted C6-C30 arylalkyl group, a substituted or unsubstituted C2-C30 heteroaryl group, a hydroxy group, a cyano group, or —N(R')(R") in which R' and R" represent each a hydrogen atom, a C1-C30 alkyl group, a C6-C30 aryl group, a C2-C30 heteroaryl group or a C3-C20 cyclic alkyl group; and m is a degree of polymerization and is a real number from 5 to 1,000.

The present invention also provides a light-emitting polymer represented by the formula II, which comprises at least one unit of $Ar_1$ repeating unit and $Ar_2$ repeating unit:

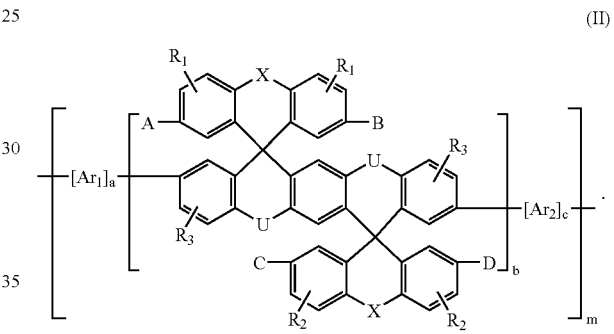

(II)

In the formula II, X and U each represent a single bond, —O—, —S—, —CO—, —Si(R')(R")—, —N(R')— or —C(R')(R")—, and at least one of X and U is not a single bond;

A, B, C and D are each a hydrogen atom, a substituted or unsubstituted C1-C30 alkylene group, a substituted or unsubstituted C2-C30 alkenylene group, a substituted or unsubstituted C3-C20 cyclic alkylene group, a substituted or unsubstituted C6-C30 arylene group, or a substituted or unsubstituted C2-C30 heteroarylene group;

$R_1$, $R_2$ and $R_3$ are each a mono-substituted or a multi-substituted functional group, and may be a hydrogen atom, a substituted or unsubstituted C1-C30 alkyl group, a substituted or unsubstituted C1-C30 alkoxy group, a substituted or unsubstituted C3-C20 cyclic alkyl group, a substituted or unsubstituted C6-C30 aryl group, a substituted or unsubstituted C6-C30 arylalkyl group, a substituted or unsubstituted C2-C30 heteroaryl group, a hydroxy group, a cyano group, or —N(R')(R") in which R' and R" represent each a hydrogen atom, a C1-C30 alkyl group, a C6-C30 aryl group, a C2-C30 heteroaryl group or a C3-C20 cyclic alkyl group;

$Ar_1$ and $Ar_2$ are each a substituted or unsubstituted C1-C30 alkylene group, a substituted or unsubstituted C2-C30 alkenylene group, a substituted or unsubstituted C6-C30 arylene group, or a substituted or unsubstituted C2-C30 heteroarylene group;

m is a degree of polymerization and is a real number from 5 to 1,000;

a represents 0 to 20% by mole, b represents 60 to 99% by mole, and c represents 0 to 20% by mole, but a and c do not represent simultaneously 0% by mole.

A light-emitting polymer represented by the formula I or II comprises an indenofluorene repeating unit having a spiroanthracene structure. The light-emitting polymer has good charge mobility and light-emitting property, particularly blue light-emitting property, and is stable thermally and chemically, due to the property of the chemical structure.

The $Ar_1$ and $Ar_2$ repeating units constituting the backbone of a blue electroluminescent polymer are selected identically or differently, and can be selected from the groups represented by the following formulae IIIa through IIIr below:

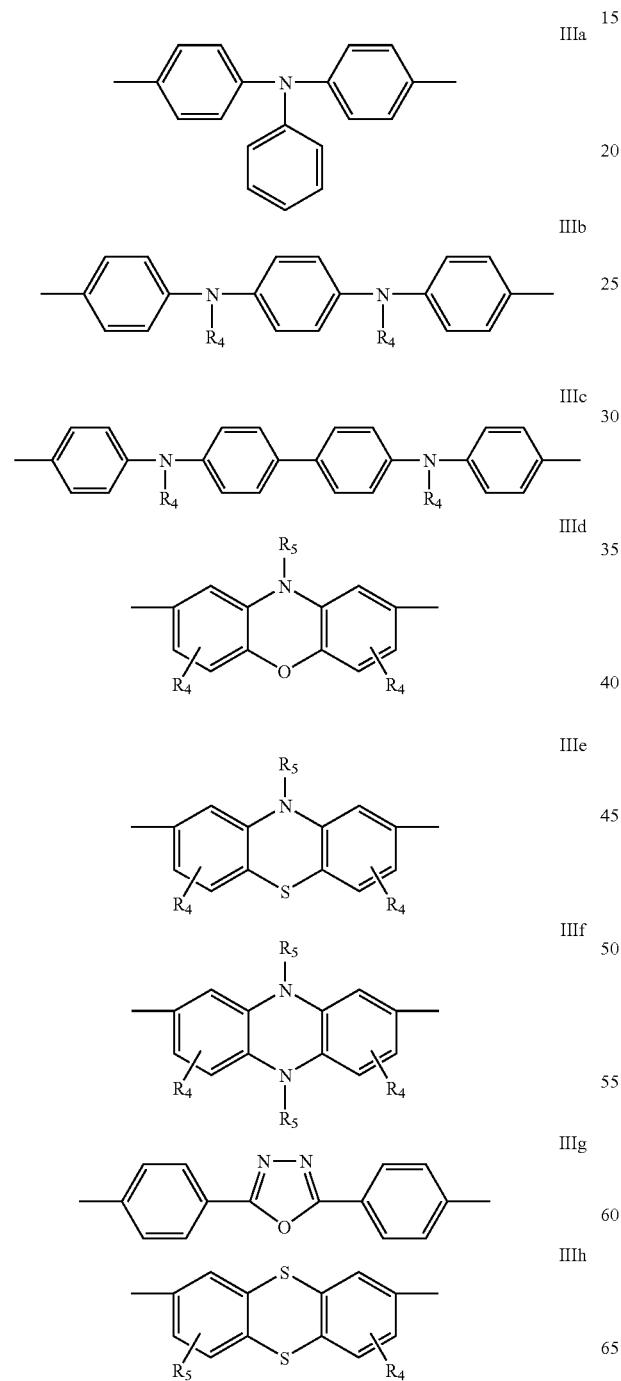
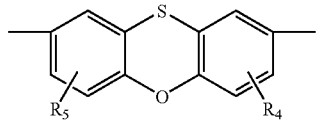
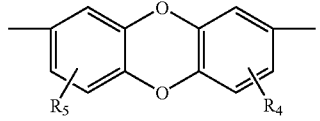
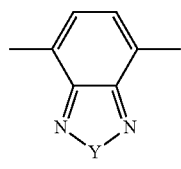
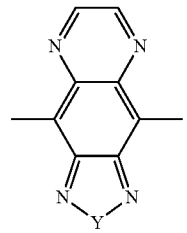
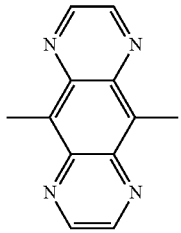
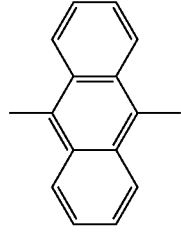

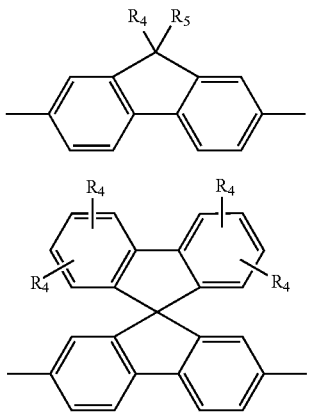

IIIq

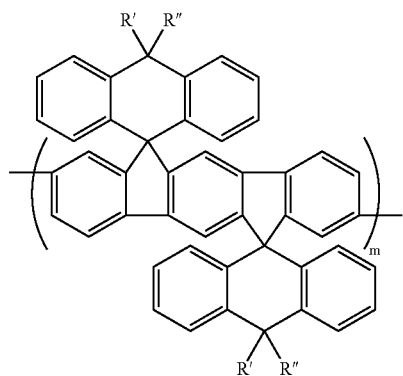

IIIr

In the formulae IIIa through IIIr, $R_4$ and $R_5$ are each a hydrogen atom, a C1-C30 alkyl group, a C1-C30 alkoxy group, a C6-C30 aryl group, or —N(R')(R") in which R' and R" represent each a hydrogen atom, a C1-C12 alkyl group or a C6-C14 aryl group.

The light-emitting polymers represented by the formula I can be compounds represented by the formulas IV and V below:

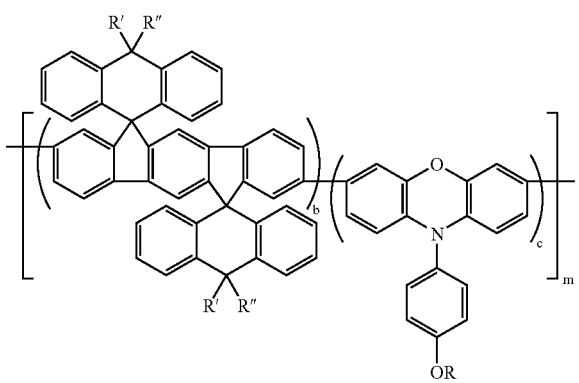

(IV)

In the formula IV, R' and R" each are preferably a C1-C20 alkyl group, and m is a real number from 5 to 1,000.

(V)

In the formula V, R, R' and R" each are preferably a C1-C20 alkyl group, m is a real number from 5 to 1,000, b represents preferably 80 to 99% by mole and, and c represents preferably 1 to 20% by mole.

A light-emitting polymer represented by the formula IV can be a polymer represented by the formula VI below:

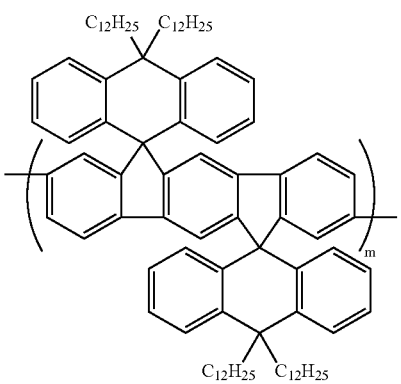

(VI)

In the formula VI, m is a real number from 5 to 1,000.

A light-emitting polymer represented by the formula V can be a polymer represented by the formula VII below:

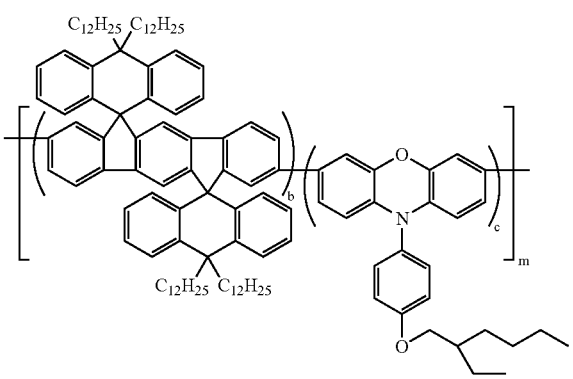

(VII)

In the formula VII, m is a real number from 5 to 1,000, b represents preferably 80 to 99% by mole, and c represents preferably 1 to 20% by mole.

Figure 2:
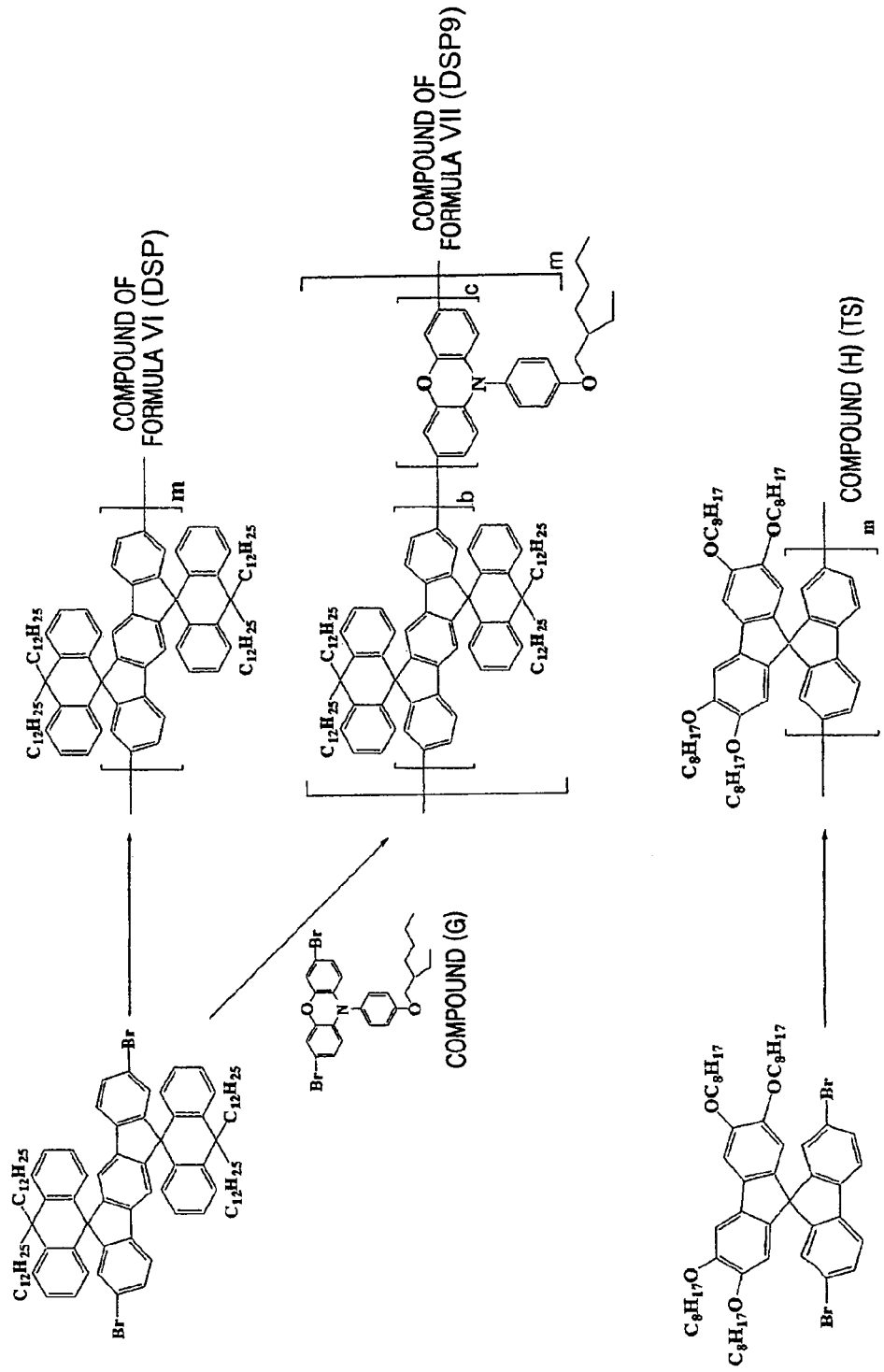
FIG. 2 is a schematic diagram illustrating the synthesis pathway of the polymer using the compound prepared according to the preparation example 1.

An embodiment for a synthesis scheme of a light-emitting polymer represented by the formula I or II according to the present invention is shown in FIGS. 1 and 2.

In the blue light-emitting polymer according to the present invention, m is a degree of polymerisation and is a real number from 5 to 1,000, preferably from 10 to 150.

The weight-average molecular weight (Mw) of the blue light-emitting polymer according to the present invention can be about 10,000 to 200,000. The molecular weight of the polymer contributes to the characteristics of formation of thin film and lifetime of a display in preparing the electroluminescent display. If the molecular weight of the polymer is below about 10,000, it may cause crystallization in preparing and driving the display. The preferred upper limit of the weight-average molecular weight of the polymer according to the present invention is defined as mentioned above because the molecular weight obtained by Pd(0) or Ni(0)-mediated aryl coupling reaction is difficult to exceed 200,000.

The smaller the molecular weight distribution (MWD) of the light-emitting polymer is, the better electroluminescent properties of the display (particularly, the lifetime of the display) are. The MWD in the present invention is preferably in a range of 1.5 to 5.

The substituted or unsubstituted C1-C30 alkyl group used herein can be a methyl, an ethyl, a propyl, an isobutyl, a sec-butyl, a pentyl, an iso-amyl, a hexyl, etc., and at least one hydrogen atom in the alkyl group can be substituted with a halogen atom, a hydroxy group, a nitro group, a cyano group, an amino group, an amidino group, a hydrazine, a hydrazone, a carboxyl group or its salt, a sulfonic acid or its salt, a phosphoric acid or its salt, or a C1-C12 alkyl group, a C1-C12 alkoxy group, a C1-C12 alkenyl group, a C1-C2 alkinyl group, a C6-C14 aryl group, a C7-C14 arylalkyl group, a C2-C14 heteroaryl group, or a substituted or unsubstituted amino group.

The substituted or unsubstituted C1-C30 alkoxy group used herein can be a methoxy, an ethoxy, a phenyloxy, a cyclohexyloxy, a naphthyloxy, an isopropyoxy, a diphenyloxy, etc., and at least one hydrogen atom in the alkoxy group can be substituted with the same substituent group as in the alkyl group described above.

The substituted or unsubstituted C3-C20 cyclic alkyl group used herein can be a cyclohexyl group, a cyclopentyl, etc., and at least one hydrogen atom in the cycloalkyl group can be substituted with the same substituent group as in the alkyl group described above.

The substituted or unsubstituted C6-C30 aryl group is used alone or in combination, and refers to a C6-C30 aromatic carbocyclic system containing at least one ring, wherein the rings can be attached or fused together in a pendant manner. The aryl can be a phenyl, a naphthyl or a tetrahydronaphthyl, etc. At least one of hydrogen atoms in the aryl group can be substituted with the same substituents as in the alkyl group described above.

The substituted or unsubstituted C6-C30 arylalkyl group used herein refers to the group that the part of hydrogen atoms in the aryl group as defined above is substituted with a group such as a lower alkyl, for example, a methyl, an ethyl, a propyl, etc. The arylalkyl group can be a benzyl, a phenylethyl, etc. At least one of hydrogen atoms in the arylalkyl group can be substituted with the same substituents as in the alkyl group described above.

The substituted or unsubstituted C2-C30 heteroaryl group used herein refers to a monovalent monocyclic or bivalent bicyclic aromatic organic compounds, and 1, 2 or 3 heteroatoms selected from N, O, P or S, and C as remaining ring atom. The heteroaryl group can be a thienyl, a pyridyl, a furyl, etc. At least one of hydrogen atoms in the heteroaryl group can be substituted with the same substituents as in the alkyl group described above.

The organic electroluminescent display is manufactured by forming an organic film, i.e., a light-emitting layer by using the polymer of the formula I or II. The organic electroluminescent display can have various structures, for example cathode/light emitting layer/anode, cathode/buffer layer/light emitting layer/anode, cathode/hole transporting layer/light emitting layer/anode, cathode/buffer layer/hole transporting layer/light emitting layer/anode, cathode/buffer layer/hole transporting layer/light emitting layer/electron transporting layer/anode, cathode/buffer layer/hole transporting layer/light emitting layer/hole blocking layer/anode and the like, but the display of the present invention is not limited to these examples.

The buffer layer is made of a material commonly used for a buffer layer, and can be made of a copper phthalocyanine, a polythiophene, a polyaniline, a polyacetylene, a polypyrrole, a polyphenylene vinylene or their derivatives, but the material is not limited to these.

The hole transporting layer is made of a material commonly used for a hole transporting layer, and can be made of, but is not limited to, polytriphenylamine.

The electron transporting layer is made of a material commonly used for an electron transporting layer, and can be made of, but is not limited to, polyoxadiazole.

The hole blocking layer can be made of a material that is commonly used for a hole blocking layer, such as LiF, $BaF_2$ or $MgF_2$ and the like, but is not limited to this.

The organic electroluminescent display of the present embodiment can be prepared by a conventional method of manufacturing an organic electroluminescent display by employing the light-emitting polymer described above, and thus does not need special apparatuses or processes.

Figure 4:
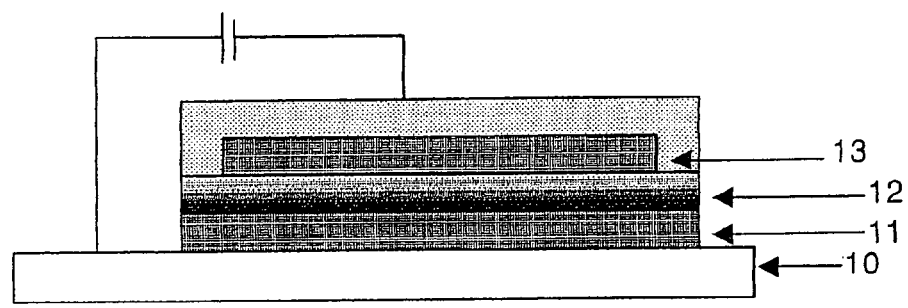
FIG. 4 is a cross-sectional view illustrating a structure of an organic electroluminescent display according to an embodiment of the present invention.

FIG. 4 illustrates the schematic structure of an organic electroluminescent display according to an embodiment of the present invention.

Referring to FIG. 4, an anode (11), a light-emitting layer (12) and a cathode (13) are sequentially laminated on an upper part of a substrate (10). Herein the light-emitting polymer of the formula I or II is used in forming the light-emitting layer (12). The light-emitting polymer of the formula I can be used in forming other organic films other than a light emitting layer.

The present invention will be described in greater detail with reference to the following examples. The following examples are for illustrative purposes and are not intended to limit the scope of the invention. FIGS. 1 and 2 show a synthetic scheme of the compound (F) and the compound (H) according to the preparation examples 1 and 2, respectively.

PREPARATION EXAMPLE 1

Preparation of Compound (F)

(1) Preparation of Compound (A)

13.20 g (50 mmol) of dibromoxylene was dissolved in 300 ml of tetrahydrofuran (THF), and then the temperature of a reactor was conditioned to −80° C. Then, 10.89 g (0.17 mol) of a tert-butylinium were dropped to the resulting reaction mixture. After completion of dropping, the temperature of the reactor was increased to −40° C., and the mixture was stirred for 12 hours. Then, the temperature of the reactor was again decreased to −80° C., 31.63 g (0.17 mol) of 2-isopropoxy-4,4,5,5-tetramethyl-1,3,2-dioxaborane was poured into the reactor, and the temperature of the reactor was slowly increased to room temperature. The reaction mixture was neutralized with an aqueous solution of HCl, and then was extracted with ether. The extracted organic layer was recrystallized with a hexane to obtain 8.95 g (yield: 50%) of the compound (A) as a white powder.

(2) Preparation of Compound (B)

7.16 g (20 mmol) of the compound (A) and 141.54 g (0.6 mol) of dibromobenzene were dissolved in 600 ml of THF, and then an aqueous solution of 400 ml of 2M $K_2CO_3$ was added to the resulting solution, and the mixture was refluxed by heating for 12 hours. Then, the reaction mixture was concentrated by drying it, and was sublimated and purified to remove excessive dibromobenzene. Then the mixture was sublimated and purified again to obtain 8.32 g (yield: 70%) of the compound (B) as a white powder.

(3) Preparation of Compound (C)

8.0 g of $KMnO_4$ and 10 ml of water were added to a flask, and then the compound (B) and 250 ml of pyridine were added to the resulting mixture and refluxed. 4.5 g of an aqueous solution of $KMnO_4$ and 10 ml of $H_2O$ were added to the reaction mixture four times at an interval of 30 minutes. Then, the resulting mixture was reacted for more 4 hours, and thereafter, 250 ml of water was further added to the mixture and the mixture was refluxed. $MnO_2$ of the reaction mixture was filtered, washed with water, and the filtrate was evaporated and the remaining solid was dissolved in water. 2M HCl was added to the resulting product to precipitate, and then the precipitated product was filtered and washed sequentially with water and ether, and dried in vacuum at 100° C. to obtain the compound (C).

(4) Preparation of Compound (D)

The compound (C) was added to 250 ml of $H_2SO_4$, and then refluxed at 80° C., and the reaction mixture was poured into ice. The precipitate produced through such procedure was filtered, and washed sequentially with methanol and THF, and dried in vacuum at 100° C. to obtain the compound (D). (Yield: 75% through 2 steps of the compounds (C) and (D)).

(5) Preparation of Compound (E)

150 ml of THF solution in which bromobenzylbenzene was dissolved was poured into flame dried Mg, and the solution was refluxed for 1 hour. When Mg almost disappeared, the temperature of the reactor was decreased to ambient temperature. While purging violently $N_2$ to the reaction mixture, the compound (D) was added and the mixture was refluxed overnight.

After completion of reaction, the reaction mixture was neutralized with an aqueous solution of HCl, and extracted with ether. A solvent was removed from an ether layer, and then the resulting product was dissolved in small amount of methylene chloride and the solution was precipitated with methanol. The precipitate thus produced was added to an acetic acid, and then a few drop of HCl was added to the mixture, and the mixture was refluxed for 2 hours.

After completion of reaction, as the temperature was decreased, a product was obtained as a precipitate. The precipitate was filtered, and dissolved in hot chloroform, and methanol was added to the solution to recrystallize it, whereby the compound (E) was obtained (yield: about 25%).

(6) Preparation of Compound (F)

The compound (E) was dissolved in THF, and 6 equivalents of dodesyl bromides and 18-crown-6 were added to the solution, and an excess of KH was added and the mixture was stirred for 3 hours.

Figure 3:
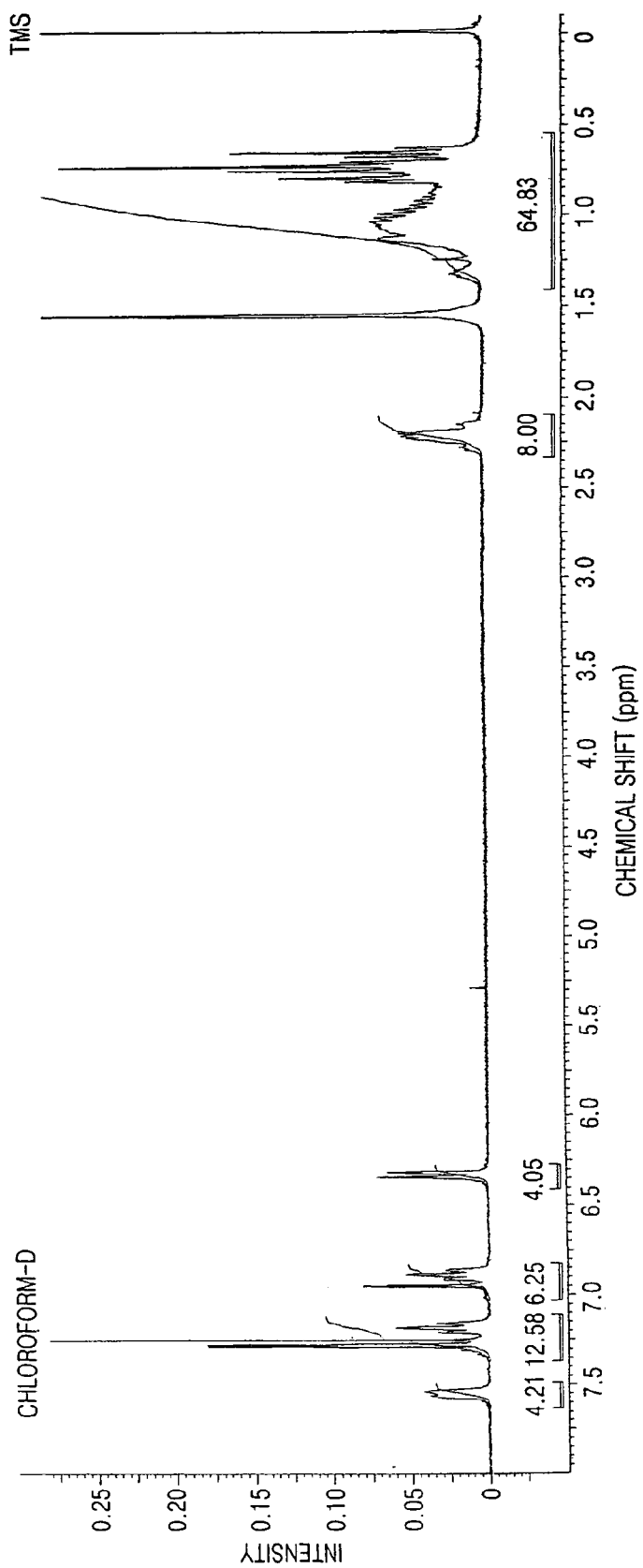
FIG. 3 is $^1$H-NMR spectrum of the compound (F) prepared in the preparation example 1.

After completion of reaction, methanol was added to the reaction mixture, thereby removing its activity, an aqueous solution of HCl was added thereto, and the solution was extracted with ether. The resulting product was separated in column (eluting liquid: hexane) to obtain the compound (F) (yield: about 40%). The structure of compound (F) was confirmed by $^1$H-NMR of FIG. 3.

PREPARATION EXAMPLE 2

Preparation of the Blue Light-Emitting Polymer

(1) Preparation of a Compound Represented by the Formula VI (DSP)

Air was several times removed from inside Schlenk flask, water was completely removed by refluxing with $N_2$, and then 880 mg (3.2 mmol) of bis(1,5-cyclooctadiene)nickel (0) (hereinafter referred to "Ni(COD)") and 500 mg (3.2 mmol) of bipyridal were added in a glove box, and air was again several times removed from inside the flask and the flask was refluxed with $N_2$. Then, 10 ml of anhydrous dimethylfuran (DMF), 346 mg (3.2 mmol) of 1,5-cyclooctadiene (COD) and 10 ml of anhydrous toluene were added under stream of $N_2$. The mixture was stirred at 80° C. for 30 minutes, and 2.25 g (0.16 mmol) of the compound (F) obtained from the preparation example 1 was diluted in 10 ml of toluene and added to the mixture. Then, 10 ml of toluene was added while washing materials smeared in the wall of the flask, and the mixture was stirred at 80° C. for 4 days. After stirring, the temperature of the reaction liquid was decreased to 60° C., and poured into a mixed solution of HCl, acetone and methanol (HCl:acetone:methanol=1:1:2 volume ratio) to form a precipitate. The precipitate was dissolved in chloroform, and a precipitate was formed again in methanol, and then soxhlet extraction was carried out about the precipitate to obtain 490 mg of the polymer of the formula VI as a white powder. From the analysis of the polymer with GPC, weight-average molecular weight (Mw) was 76,000 and the molecular weight distribution (MWD) was 2.13.

(2) Preparation of a Compound Represented by the Formula VII (DSP-9)

Air was several times removed from the Schlenk flask, water was completely removed by refluxing with $N_2$, and then 880 mg (3.2 mmol) of Ni(COD) and 500 mg (3.2 mmol) of bipyridal were added in glove box, and air was again several times removed from inside the flask and the flask was refluxed with $N_2$. Then, 10 ml of anhydrous dimethylfuran (DMF), 346 mg (3.2 mmol) of 1,5-cyclooctadiene (COD) and 10 ml of anhydrous toluene were added under stream of $N_2$. The mixture was stirred at 80° C. for 30 minutes, and 2.03 g (1.44 mmol) of the compound (F) obtained from the example 1 and 87 mg (0.16 mmol) of the compound (G), phenoxazine derivative were diluted in 10 ml of toluene and added to the mixture. Then, 10 ml of toluene was added while washing materials smeared in the wall of the flask, and the mixture was stirred at 80° C. for 4 days. After stirring, the temperature of the reaction liquid was decreased to 60° C., and poured into a mixed solution of HCl, acetone and methanol (HCl:acetone:methanol=1:1:2 volume ratio) to form a precipitate. The precipitate was dissolved in chloroform, and a precipitate was formed again in methanol, and then soxhlet extraction was carried out about the precipitate to obtain 400 mg of the polymer of the formula VII as a yellow powder. From the analysis of the polymer with GPC, weight-average molecular weight (Mw) was 81,000 and the molecular weight distribution (MWD) was 2.37.

COMPARATIVE PREPARATION EXAMPLE 1

Preparation of Poly(2',3',6',7'-tetraoctyloxy spirofluorene) [TS]

Air was several times removed from inside Schlenk flask, water was completely removed by refluxing with $N_2$, and then 880 mg (3.2 mmol) of Ni(COD) and 500 mg (3.2 mmol) of bipyridal were added in glove box, and air was again several times removed from inside the flask and the flask was refluxed with $N_2$. Then, 10 ml of anhydrous DMF, 346 mg (3.2 mmol) of COD and 10 ml of anhydrous toluene were added under stream of $N_2$. The mixture was stirred at 80° C. for 30 minutes, and 1.58 g (1.6 mmol) of 2,7-dibromo-2',3',6',7'-dioctyloxy spirofluorene were diluted in 10 ml of toluene and added to the mixture. Then, 10 ml of toluene was added while washing materials smeared on the wall of the flask, and the mixture was stirred at 80° C. for 4 days. After 4 days, 1 ml of bromopentafluorobenzne was added and the mixture was stirred at 80° C. for about a day.

After stirring, the temperature of the reaction liquid was decreased to 60° C., and poured into a mixed solution of HCl, acetone and methanol (HCl:acetone:methanol=1:1:2 volume ratio) to form a precipitate. The precipitate was dissolved in chloroform, and a precipitate was formed again in methanol, and then soxhlet extraction was carried out about the precipitate to obtain 600 mg (yield: 80%) of a white powder. From the analysis of the polymer with GPC, weight-average molecular weight (Mw) was 19,000 and the molecular weight distribution (MWD) was 1.94.

Figure 5A:
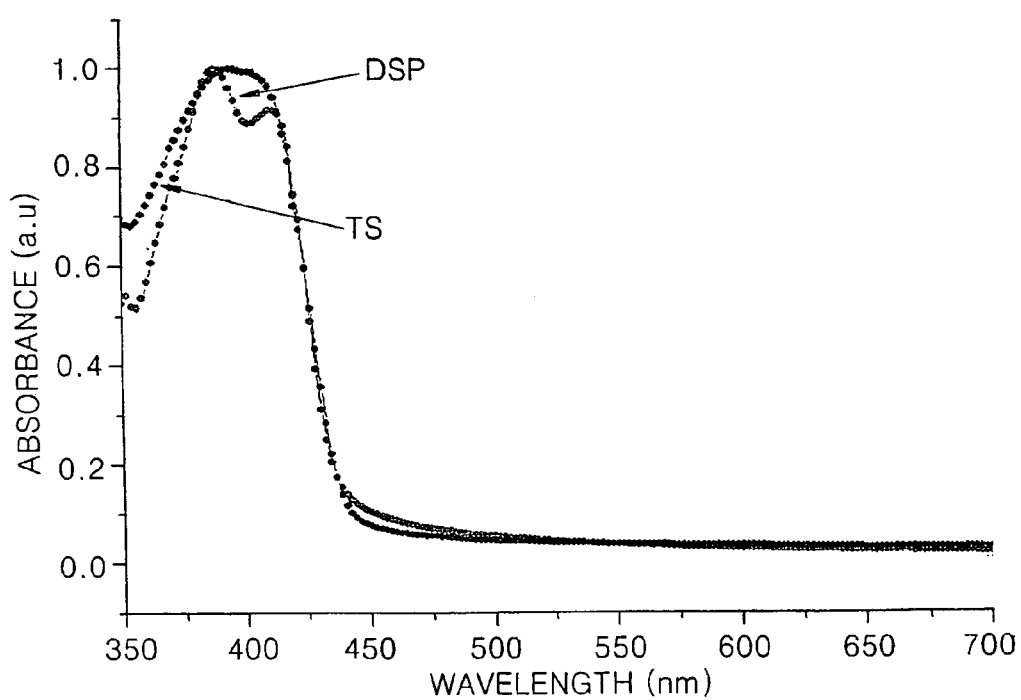
FIG. 5A is a graph showing UV absorption spectrum of the polymer (DSP and TS) prepared in the preparation example 2 and the comparative preparation example 1.
Figure 5B:
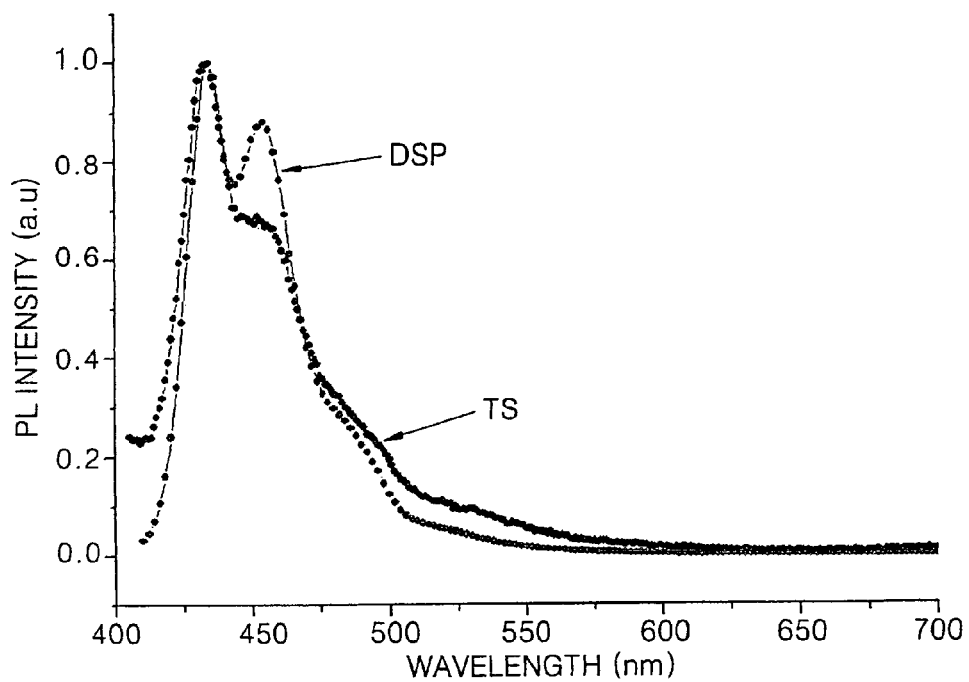
FIG. 5B is a graph showing PL (Photoluminescence) spectrum of the polymer (DSP and TS) prepared in the preparation example 2 and the comparative preparation example 1.
Figure 5C:
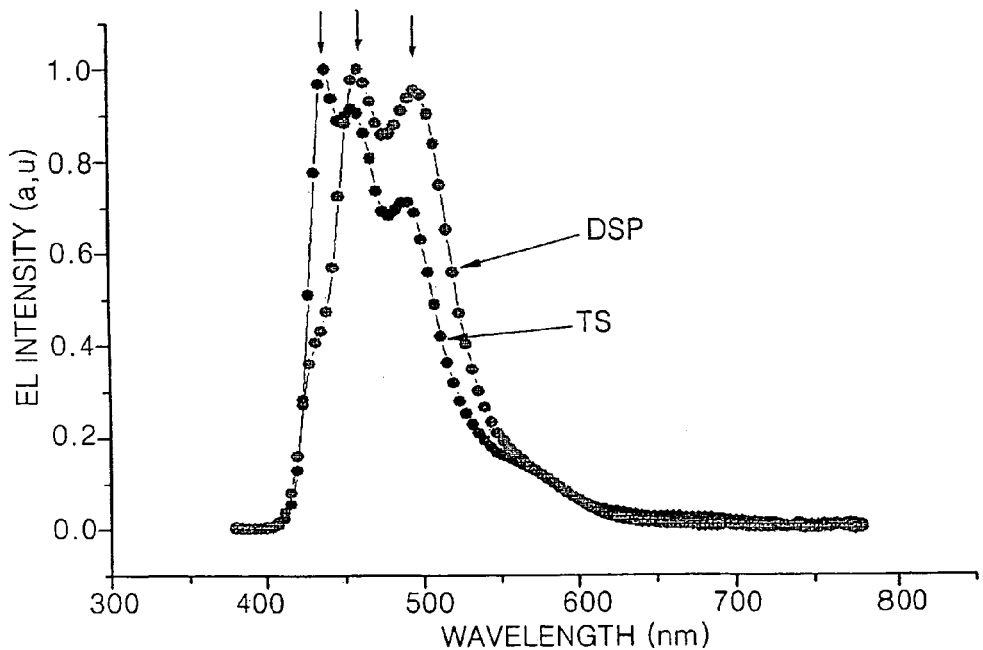
FIG. 5C is a graph showing EL (Electroluminescence) spectrum of the polymer (DSP and TS) prepared in the preparation example 2 and the comparative preparation example 1.

UV absorption spectrum, PL spectrum and EL spectrum of the polymer (DSP and TS) prepared in the preparation example 2 and the comparative preparation example 1 are respectively shown FIGS. 5A to 5C.

Referring to FIGS. 5A through 5C, it can be seen that the compound using indenofluroene repeating unit having the spiroanthracene structure according to the present invention has similar electronic state and optical property as fluorene or spirofluorene compounds.

EXAMPLE 1

Preparation of an Organic Electroluminescent Display

First, a clear electrode substrate in which ITO (indium-tin oxide) was coated on glass substrate was washed cleanly, and ITO was patterned in desired pattern using a photoresist resin and an etchant, and washed again cleanly. Barton P 4083 (manufactured by Bayer Co.) (PEDOT) was coated thereon to a thickness of about 500 to 1,100 Å as a conducting buffer layer, and then the coat was baked at 180° C. for about an hour.

Then, 0.1 parts by weight of the polymer of the formula VI prepared by the preparation example 2 was dissolved in 99.9 parts by weight of toluene to provide a composition for forming a light-emitting layer, and the composition was spin-coated on the buffer layer, and then after baking a solvent was completely removed in vacuum oven to form a light-emitting layer. Herein, the composition for forming the light-emitting layer was filtered through a 0.2 mm filter, and the thickness of the light-emitting layer was controlled at a range of about 50 to 100 nm by controlling the concentration and the spin speed of the composition. Then, while maintaining the vacuum level below $4 \times 10^{-6}$ torr, Ca and Al were sequentially deposited on the upper part of the light-emitting layer using a vacuum deposition apparatus to form a cathode. The film thickness and the film growth rate, when depositing, were controlled using a crystal sensor. The EL display thus prepared is a monolayer display having a structure of ITO/PEDOT/light-emitting layer/$BaF_2$/Ca/Al, its schematic structure is shown in FIG. 4, and a light-emitting area thereof was 4 $mm^2$.

EXAMPLE 2

An organic electroluminescent display was prepared according to the same process used in example 1 except that in preparing the composition for forming a light-emitting layer, the polymer of the formula VII, i.e., DSP-9, prepared according to the comparative preparation example 1 was used instead of the polymer of the formula VI prepared according to the preparation example 2.

COMPARATIVE EXAMPLE 1

An organic electroluminescent display was prepared according to the same process used in example 1 except that in preparing the composition for forming a light-emitting layer, TS prepared according to comparative preparation example 1 was used instead of the polymer of the formula VI prepared according to preparation example 2.

EL (electroluminescence) properties of respective displays prepared by the examples 1 and 2 and the comparative example 1 were evaluated, and evaluation results are shown in Table 1. During evaluation, a forward bias voltage of direct current voltage was used as driving voltage.

TABLE 1

| | Property EL property | | | | |
| --- | --- | --- | --- | --- | --- |
| Example | EL (λmax) | Efficiency (cd/A) @ 100 nit | CIE(x, y) @100 nit | CIE(x, y) @1000 nit | Driving voltage (V) |
| Example 1 | 459, 495 | 1.78 (@5.9 V) | 0.16, 0.25 | 0.16, 0.24 | 4.5 |
| Example 2 | 465 | 4.8 (@4.5 V) | 0.17, 0.27 | 0.17, 0.26 | 2.4 |
| Comparative Example 1 | 439, 457 | 0.53 (@6.6 V) | 0.18, 0.19 | 0.17, 0.17 | 5.5 |

As can be seen in Table 1, the organic electroluminescent display of the example 1 exhibited an efficiency 3 times higher than that of the organic electroluminescent display of the comparative example 1. Additionally, the driving voltage for the organic electroluminescent display of the example 1 was smaller by 1V than the driving voltage of the organic electroluminescent display of the comparative example 1. Also, the copolymer incorporating the hole transporting material of the example 2 exhibited improved charge injection property.

Figure 6:
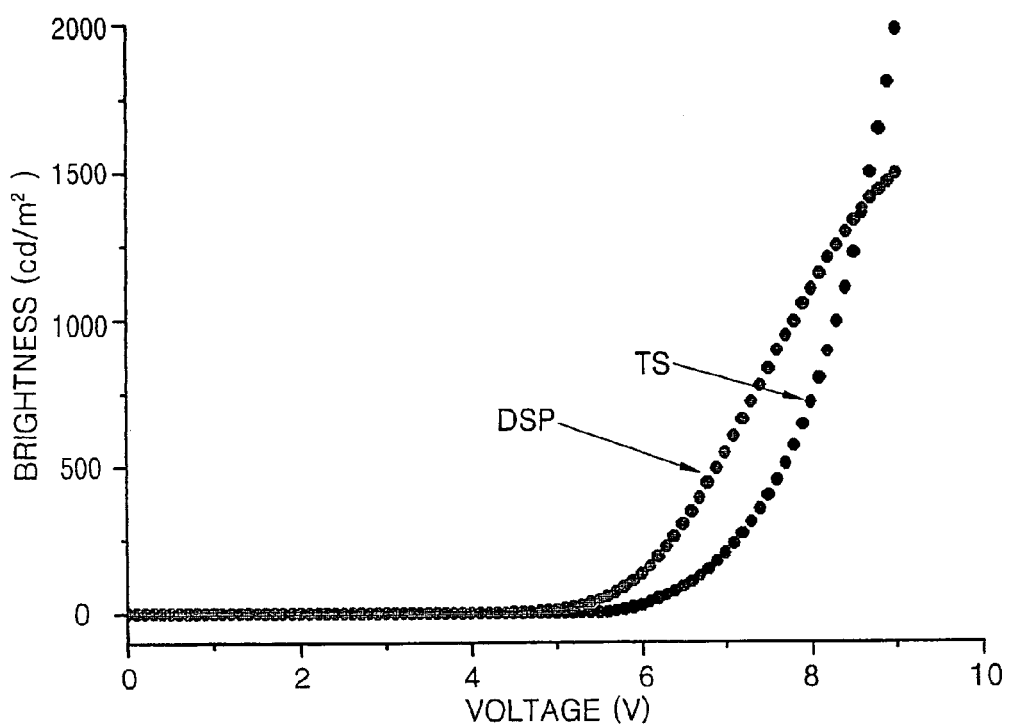
FIG. 6 is a graph showing voltage-brightness relation in the organic electroluminescent display of the example 1 and the comparative example 1.
Figure 7:
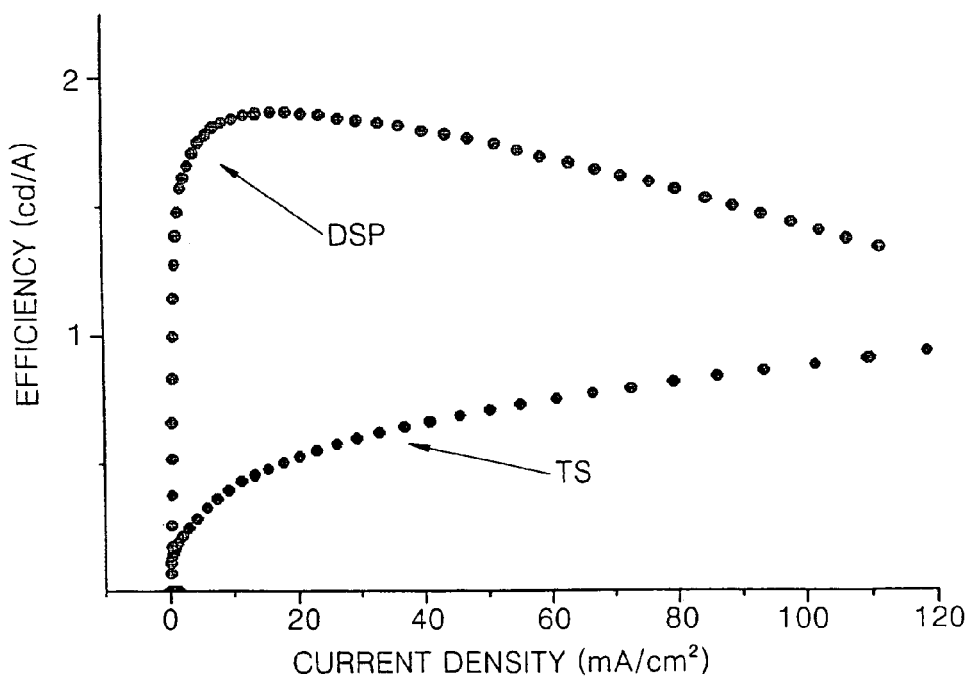
FIG. 7 is a graph showing current density-efficiency relation in the organic electroluminescent display of the example 1 and the comparative example 1.

The voltage-brightness relation and current density-efficiency relation in the organic electroluminescent display of the example 1 and the comparative example 1 are shown in FIGS. 6 and 7. Referring to the FIGS. 6 and 7, the organic electroluminescent display of the example 1 exhibited excellent stability: the display maintained the initial voltage and current density property intact even after several repetitive drivings.

As explained in detail hereto, the blue light-emitting polymer according to the present invention has superior charge mobility and light-emitting property, and accordingly an organic electroluminescent display with improved efficiency and brightness can be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light-emitting polymer represented by the formula I:

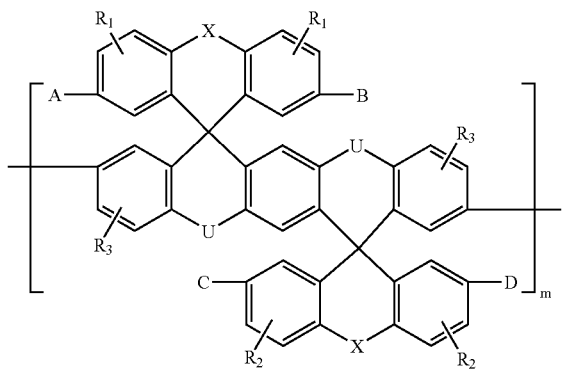

(I)

wherein X and U are independently selected from the group consisting of a single bond, —O—, —S—, —CO—, —Si(R')(R")—, —N(R')— and —C(R')(R")—, and at least one of X and U is not a single bond;

A, B, C and D are independently selected from the group consisting of a hydrogen atom, a substituted or unsubstituted C1-C30 alkylene group, a substituted or unsubstituted C2-C30 alkenylene group, a substituted or unsubstituted C3-C20 cyclic alkylene group, a substituted or unsubstituted C6-C30 arylene group, and a substituted or unsubstituted C2-C30 heteroarylene group;

$R_1$, $R_2$ and $R_3$ are independently selected from the group consisting of a hydrogen atom, a substituted or unsubstituted C1-C30 alkyl group, a substituted or unsubstituted C1-C30 alkoxy group, a substituted or unsubstituted C3-C20 cyclic alkyl group, a substituted or unsubstituted C6-C30 aryl group, a substituted or unsubstituted C6-C30 arylalkyl group, a substituted or unsubstituted C2-C30 heteroaryl group, a hydroxy group, a cyano group, and —N(R')(R") in which R' and R" are independently selected from the group consisting of a hydrogen atom, a substituted or unsubstituted C1-C30 alkyl group, a substituted or unsubstituted C6-C30 aryl group, a substituted or unsubstituted C2-C30 heteroaryl group, and a substituted or unsubstituted C3-C20 cyclic alkyl group; and m is a degree of polymerization and is a real number from 5 to 1,000.

2. The light-emitting polymer of claim 1, wherein the light-emitting polymer of claim 1 further comprises at least one repeating unit of $Ar_1$ repeating unit and $Ar_2$ repeating unit, and the light-emitting polymer is represented by the formula II:

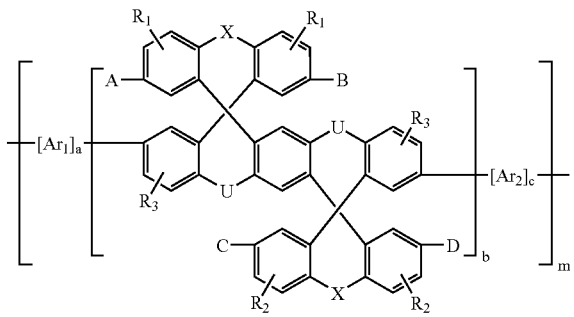

(II)

wherein X and U are independently selected from the group consisting of a single bond, —O—, —S—, —CO—, —Si(R')(R")—, —N(R')— and —C(R')(R")—, and at least one of X and U is not a single bond;

A, B, C and D are independently selected from the group consisting of a hydrogen atom, a substituted or unsubstituted C1-C30 alkylene group, a substituted or unsubstituted C2-C30 alkenylene group, a substituted or unsubstituted C3-C20 cyclic alkylene group, a substituted or unsubstituted C6-C30 arylene group and a substituted or unsubstituted C2-C30 heteroarylene group;

$R_1$, $R_2$ and $R_3$ are independently selected from the group consisting of a hydrogen atom, a substituted or unsubstituted C1-C30 alkyl group, a substituted or unsubstituted C1-C30 alkoxy group, a substituted or unsubstituted C3-C20 cyclic alkyl group, a substituted or unsubstituted C6-C30 aryl group, a substituted or unsubstituted C6-C30 arylalkyl group, a substituted or unsubstituted C2-C30 heteroaryl group, a hydroxy group, a cyano group and —N(R')(R") in which R' and R" are independently selected from the group consisting of a hydrogen atom, a C1-C30 alkyl group, a C6-C30 aryl group, a C2-C30 heteroaryl group and a C3-C20 cyclic alkyl group;

$Ar_1$ and $Ar_2$ are independently selected from the group consisting of a substituted or unsubstituted C1-C30 alkylene group, a substituted or unsubstituted C2-C30 alkenylene group, a substituted or unsubstituted C6-C30 arylene group and a substituted or unsubstituted C2-C30 heteroarylene group;

m is a degree of polymerization and is a real number from 5 to 1,000; and a represents 0 to 20% by mole, b represents 60 to 99% by mole, and c represents 0 to 20% by mole, but a and c do not represent simultaneously 0 mole %.

3. The light-emitting polymer of claim 2, wherein the $Ar_1$ repeating unit and the $Ar_2$ repeating unit are independently selected from the group consisting of the formulae IIIa through IIIr:

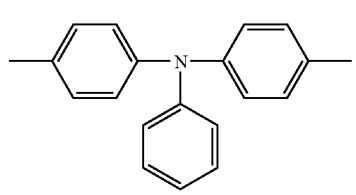

IIIa

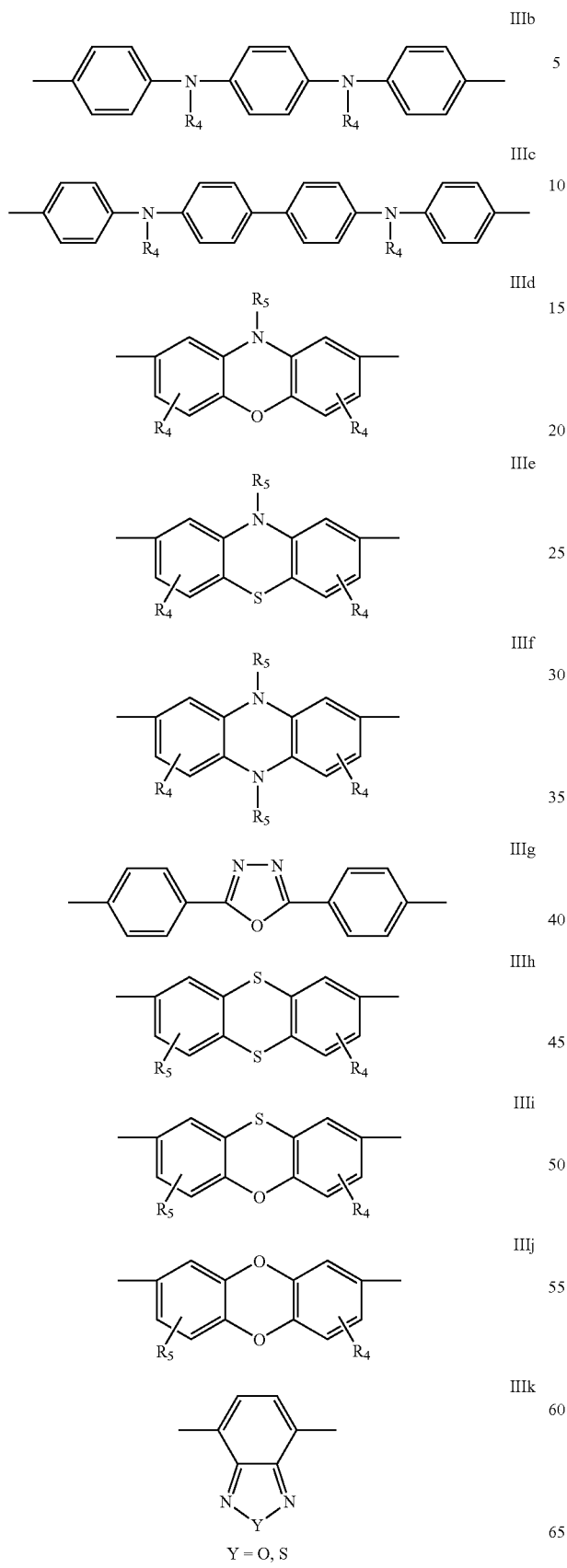
wherein $R_4$ and $R_5$ are independently selected from the group consisting of a hydrogen atom, a C1-C30 alkyl group, a C1-C30 alkoxy group, a C6-C30 aryl group, and —N(R')(R'') in which R' and R'' are independently selected from the group consisting of a hydrogen atom, a C1-C12 alkyl group and a C6-C14 aryl group.

4. The light-emitting polymer of claim 1, wherein the weight-average molecular weight (Mw) of the polymer represented by the formula I is 10,000 to 200,000, and the molecular weight distribution (MWD) is 1.5 to 5.

5. The light-emitting polymer of claim 2, wherein the weight-average molecular weight (Mw) of the polymer represented by the formula II is 10,000 to 200,000, and the molecular weight distribution (MWD) is 1.5 to 5.

6. The light-emitting polymer of claim 1, wherein the polymer is represented by the formula IV:

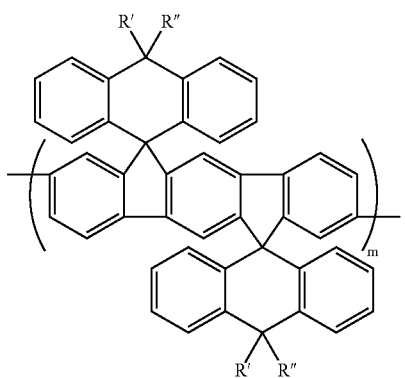

(IV)

wherein R' and R" each represent a C1-C20 alkyl group, and m is a real number from 5 to 1,000.

7. The light-emitting polymer of claim 6, wherein the polymer is represented by the formula VI:

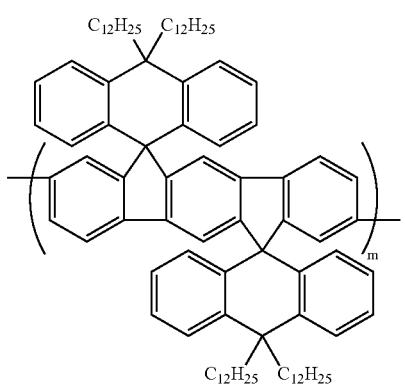

(VI)

wherein m is a real number from 5 to 1,000.

8. The light-emitting polymer of claim 2, wherein the polymer is represented by the formula V:

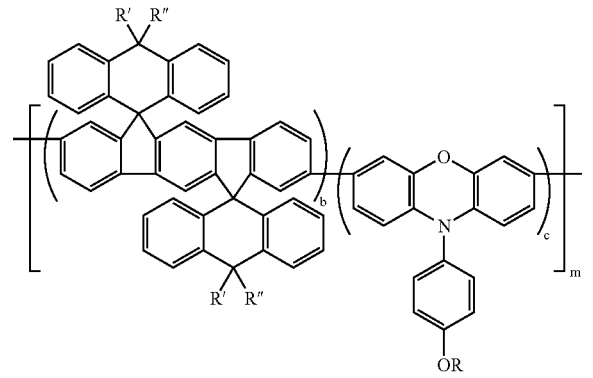

(V)

wherein R, R' and R" each represent a C1-C20 alkyl group, m is a real number from 5 to 1,000, b represents 80 to 99% by mole, and c represents 1 to 20% by mole.

9. The light-emitting polymer of claim 8, wherein the polymer is represented by the formula VII:

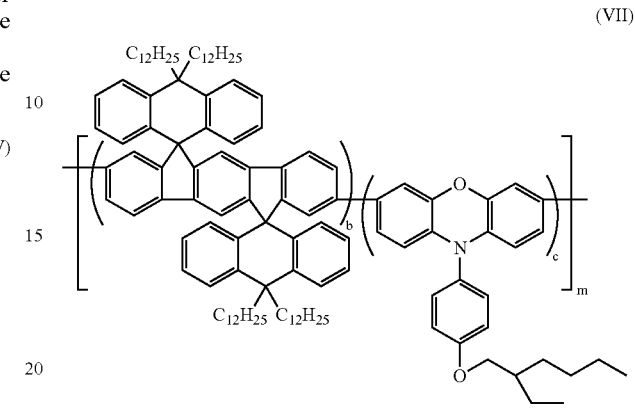

(VII)

wherein m is a real number from 5 to 1,000, b represents 80 to 99% by mole, and c represents 1 to 20% by mole.

10. An organic electroluminescent display comprising an organic film between a pair of electrodes, wherein the organic film comprises the light-emitting polymer of claim 1.

11. The organic electroluminescent display of claim 10, wherein the organic film is a light emitting layer.

12. A light-emitting polymer represented by the formula II:

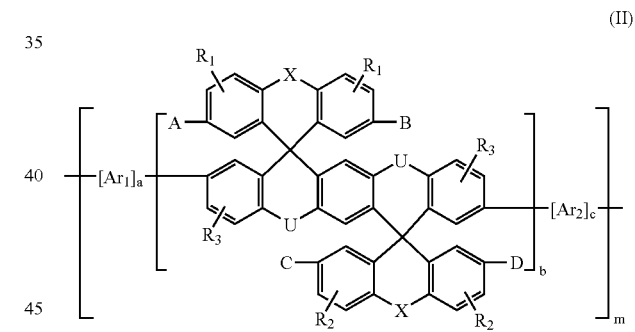

(II)

wherein X and U are independently selected from the group consisting of a single bond, —O—, —S—, —CO—, —Si(R')(R")—, —N(R')— and —C(R')(R")—, and at least one of X and U is not a single bond;

A, B, C and D are independently selected from the group consisting of a hydrogen atom, a substituted or unsubstituted C1-C30 alkylene group, a substituted or unsubstituted C2-C30 alkenylene group, a substituted or unsubstituted C3-C20 cyclic alkylene group, a substituted or unsubstituted C6-C30 arylene group, and a substituted or unsubstituted C2-C30 heteroarylene group;

$R_1$, $R_2$ and $R_3$ are independently selected from the group consisting of a hydrogen atom, a substituted or unsubstituted C1-C30 alkyl group, a substituted or unsubstituted C1-C30 alkoxy group, a substituted or unsubstituted C3-C20 cyclic alkyl group, a substituted or unsubstituted C6-C30 aryl group, a substituted or unsubstituted C6-C30 arylalkyl group, a substituted or unsubstituted C2-C30 heteroaryl group, a hydroxy group, a cyano group, and —N(R')(R") in which R' and R" are independently selected from the group consisting of a hydrogen atom, a substituted or unsubstituted C1-C30 alkyl group, a substituted or unsubstituted C6-C30 aryl group, a substituted or unsubstituted C2-C30 heteroaryl group, and a substituted or unsubstituted C3-C20 cyclic alkyl group;

m is a degree of polymerization and is a real number from 5 to 1,000;

Ar₁ and Ar₂ are independently selected from the group consisting of a substituted or unsubstituted C1-C30 alkylene group, a substituted or unsubstituted C2-C30 alkenylene group, a substituted or unsubstituted C6-C30 arylene group and a substituted or unsubstituted C2-C30 heteroarylene group; and a represents 0 to 20% by mole, b represents 60 to 99% by mole, and c represents 0 to 20% by mole.

13. An organic electroluminescent display, comprising:
a pair of electrodes;
a light emitting layer between said pair of electrodes, said light emitting layer comprising a polymer represented by the formula I or the formula II:

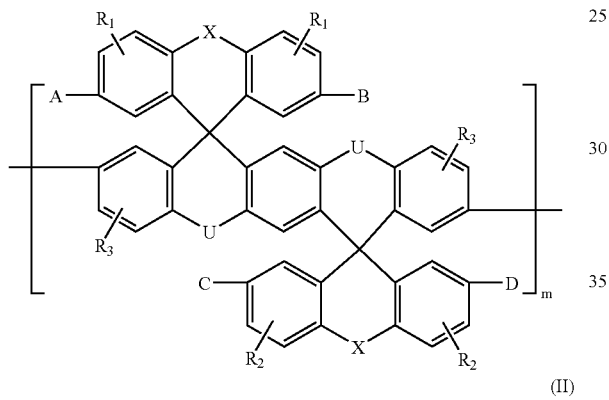
(I)

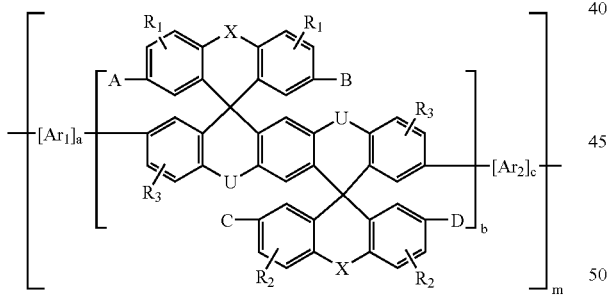
(II)

wherein X and U are independently selected from the group consisting of a single bond, —O—, —S—, —CO—, —Si(R')(R")—, —N(R')— and —C(R')(R")—, and at least one of X and U is not a single bond;

A, B, C and D are independently selected from the group consisting of a hydrogen atom, a substituted or unsubstituted C1-C30 alkylene group, a substituted or unsubstituted C2-C30 alkenylene group, a substituted or unsubstituted C3-C20 cyclic alkylene group, a substituted or unsubstituted C6-C30 arylene group and a substituted or unsubstituted C2-C30 heteroarylene group;

$R_1$, $R_2$ and $R_3$ are independently selected from the group consisting of a hydrogen atom, a substituted or unsubstituted C1-C30 alkyl group, a substituted or unsubstituted C1-C30 alkoxy group, a substituted or unsubstituted C3-C20 cyclic alkyl group, a substituted or unsubstituted C6-C30 aryl group, a substituted or unsubstituted C6-C30 arylalkyl group, a substituted or unsubstituted C2-C30 heteroaryl group, a hydroxy group, a cyano group and —N(R')(R") in which R' and R" are independently selected from the group consisting of a hydrogen atom, a C1-C30 alkyl group, a C6-C30 aryl group, a C2-C30 heteroaryl group and a C3-C20 cyclic alkyl group;

Ar₁ and Ar₂ are independently selected from the group consisting of a substituted or unsubstituted C1-C30 alkylene group, a substituted or unsubstituted C2-C30 alkenylene group, a substituted or unsubstituted C6-C30 arylene group and a substituted or unsubstituted C2-C30 heteroarylene group;

m is a degree of polymerization and is a real number from 5 to 1,000; and a represents 0 to 20% by mole, b represents 60 to 99% by mole, and c represents 0 to 20% by mole, but a and c do not represent simultaneously 0 mole %.

14. The organic electroluminescent display of claim 13, wherein the Ar₁ repeating unit and the Ar₂ repeating unit are independently selected from the group consisting of the formulae IIIa through IIIr:

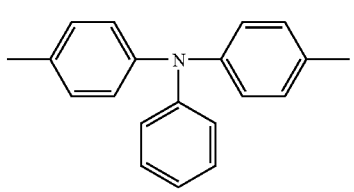
IIIa

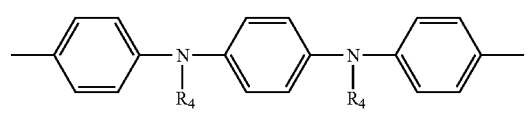
IIIb

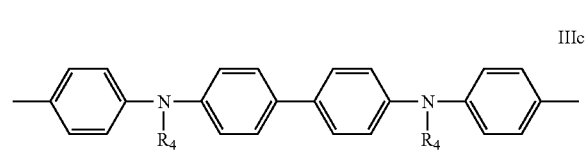
IIIc

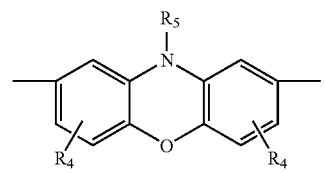
IIId

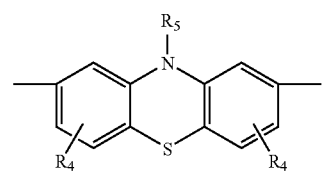
IIIe

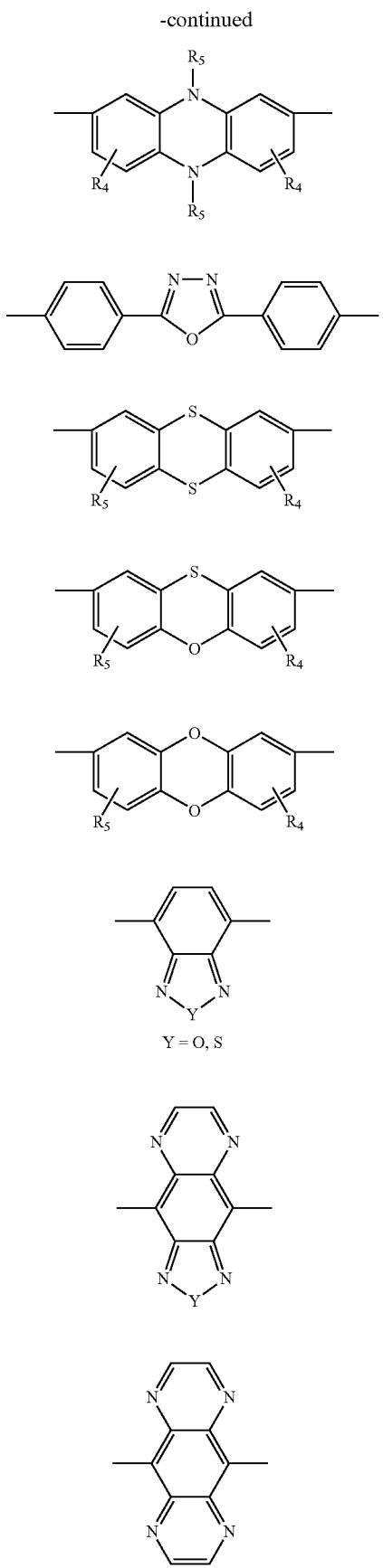

wherein $R_4$ and $R_5$ are independently selected from the group consisting of a hydrogen atom, a C1-C30 alkyl group, a C1-C30 alkoxy group, a C6-C30 aryl group, and —N(R')(R") in which R' and R" is selected from the group consisting of a hydrogen atom, a C1-C12 alkyl group and a C6-C14 aryl group.

15. The organic electroluminescent display of claim 13, wherein the weight-average molecular weight (Mw) of the polymer is 10,000 to 200,000.

16. The organic electroluminescent display of claim 15, wherein the molecular weight distribution (MWD) of the polymer is 1.5 to 5.

17. The organic electroluminescent display of claim 13, wherein the polymer is represented by the formula IV:

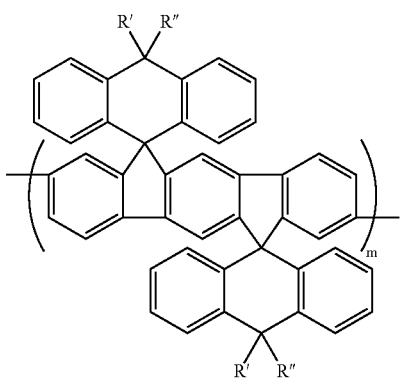

(IV)

wherein R' and R" each represent a C1-C20 alkyl group, and m is a real number from 5 to 1,000.

18. The organic electroluminescent display of claim 17, wherein the polymer is represented by the formula VI:

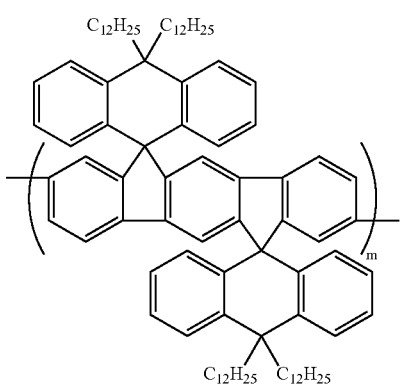

(VI)

wherein m is a real number from 5 to 1,000.

19. The organic electroluminescent display of claim 13, wherein the polymer is represented by the formula V:

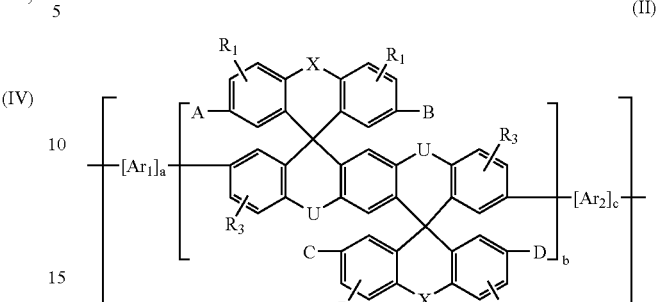

(II)

wherein R, R' and R" each represent a C1-C20 alkyl group, m is a real number from 5 to 1,000, b represents 80 to 99% by mole, and c represents 1 to 20% by mole.

20. The organic electroluminescent display of claim 19, wherein the polymer is represented by the formula VII:

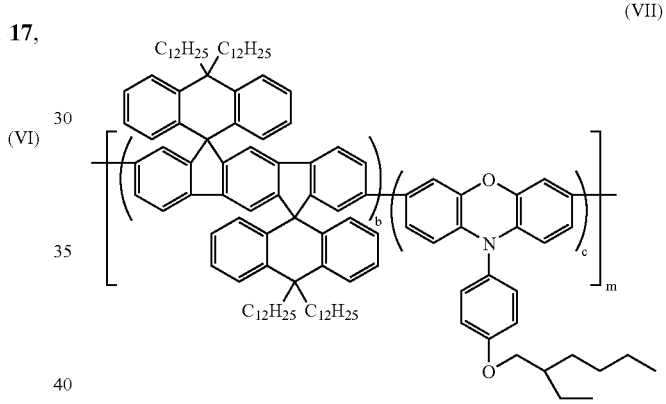

(VII)

wherein m is a real number from 5 to 1,000, b represents 80 to 99% by mole, and c represents 1 to 20% by mole.

* * * * *